US008325979B2

(12) United States Patent
Taborowski et al.

(10) Patent No.: US 8,325,979 B2
(45) Date of Patent: Dec. 4, 2012

(54) METHOD AND APPARATUS FOR DETECTING OBJECTS FROM TERRESTRIAL BASED MOBILE MAPPING DATA

(75) Inventors: Lukasz Piotr Taborowski, Lask (PL); Rafal Jan Gliszczynski, Lodz (PL); Arkadiusz Wysocki, Lodz (PL); Marcin Michal Kmiecik, Lodz (PL)

(73) Assignee: TomTom Global Content B.V., Eindhoven (NL)

( * ) Notice: Subject to any disclaimer, the term of this patent is extended or adjusted under 35 U.S.C. 154(b) by 728 days.

(21) Appl. No.: 12/311,465

(22) PCT Filed: Oct. 30, 2007

(86) PCT No.: PCT/NL2007/050520
§ 371 (c)(1),
(2), (4) Date: Sep. 18, 2009

(87) PCT Pub. No.: WO2008/054203
PCT Pub. Date: May 8, 2008

(65) Prior Publication Data
US 2010/0020074 A1 Jan. 28, 2010

(30) Foreign Application Priority Data
Oct. 30, 2006 (WO) ................ PCT/NL2006/050269

(51) Int. Cl.
*G06K 9/00* (2006.01)
(52) U.S. Cl. ....................................... 382/103
(58) Field of Classification Search .......... 382/100–107; 348/113, 169–173; 340/907–910, 933–940; 356/3–30; 73/488–492
See application file for complete search history.

(56) References Cited

OTHER PUBLICATIONS

Mathias Perrollaz et al. "Long range obstacle detection using laser scanner and stereovision." Proceedings of IV2006. IEEE Intelligent Vehicles Symposium IEEE Piscataway, NJ, USA, Jun. 2006, p. 182-187.
Laurent Trassoudaine et al. "Smart sensing and multisensorial data fusion for road obstacle detection and tracking." Traitment Du Signal Gretsi France, vol. 13, No. 2, 1996, pp. 127-142.

(Continued)

*Primary Examiner* — Atiba O Fitzpatrick

(57) ABSTRACT

A method of detecting objects from terrestrial based mobile mapping data is disclosed, wherein the terrestrial based mobile mapping data has been captured by way of a terrestrial based mobile mapping vehicle driving on a road having a driving direction, the mobile mapping data including laser scanner data, source images obtained by at least one camera and position and orientation data of the vehicle, wherein the laser scanner data includes laser points, each laser point having associated position and orientation data, and each source image comprises associated position and orientation data. In at least one embodiment, the method includes: retrieving a position and orientation of the vehicle; filtering the laser scanner data in dependence of the position and orientation of the vehicle to obtain laser points corresponding to regions of interest; retrieving a source image associated with the position and orientation of the vehicle; mapping the laser points corresponding to regions of interest to image coordinates of the source image to generate a recognition mask; combining the recognition mask and the source image to obtain candidate 3D images representative of possible objects within the regions of interest; and, detecting a group of objects from the candidate 3D images. By combining image recognition and laser scanner recognition the detection rate can be increased to a very high percentage, thereby substantially reducing human effort. Furthermore, the generating of regions of interest in the laser data, enables a significant reduction of the processing power and/or the processing time needed to detect the objects in the images.

18 Claims, 8 Drawing Sheets

OTHER PUBLICATIONS

Tsai-hong Hong et al. "Fusing ladar and color image formation for mobile robot feature detection and tracking." 7th International Conference on Intelligent Autonomous Systems, 2002, Retrieved from Internet: http://cs-www.cs.yale.edu/homes/rasmussen/lib/_papers/ias2002.pdf.

James Albus et al. "4D/RCS sensory processing and world modeling on the Demo III experimental unmanned ground vehicles." Proceedings of the 2002 IEEE International Symposium on Intelligent Control, Vancouver, Canada, IEEE Symposium on Intelligent Control, New York, NY, Oct. 27, 20002, pp. 885-890.

Rongxing Li. "Mobile mapping—an emerging technology for spatial data acquisition." Photogrammetric Engineering and Remote Sensing, Online: http://shoreling.eng.ohio-state.edu/ron/teaching/787/paperl.pdf, 1997.

PCT/ISA/206, 2006.

METHOD AND APPARATUS FOR DETECTING OBJECTS FROM TERRESTRIAL BASED MOBILE MAPPING DATA

FIELD OF THE INVENTION

The present invention relates to a method of detecting objects from terrestrial based mobile mapping data, wherein the terrestrial based mobile mapping data has been captured by means of a terrestrial based mobile mapping vehicle driving on a road having a driving direction, the mobile mapping data comprising laser scanner data, source images obtained by at least one camera and position and orientation data of the vehicle, wherein the laser scanner data comprises laser points, each laser point having associated position and orientation data, and each source image comprises associated position and orientation data. The invention further relates to an apparatus for capturing objects for use in a map database from terrestrial based mobile mapping data, a computer program and a processor readable medium carrying the computer program.

PRIOR ART

There is a need to collect a large number of "vertical" road information e.g. road signs, speed limits, direction signposts, bill boards etc. for digital map databases used in navigation systems and the like. The term "vertical" indicates that an information plane of the road information is generally parallel to the gravity vector. A characteristic of "vertical road information" is that they are generally planar. Nowadays, vertical road information can be obtained by analysing and interpreting vertical picture images and other data collected by a mobile collection device. Mobile mapping vehicles which are terrestrial based vehicles, such as a car or van, are used to collect mobile mapping data for enhancement of digital map databases. Examples of enhancements are the location of traffic signs, road signs, traffic lights, street signs showing the name of the street etc. The geo-spatial location of these objects can be added to the map databases, the location of these objects within the imagery can also be further used to extract the information presented on the sign.

The mobile mapping vehicles have a number of cameras, some of them are stereographic. The cameras are accurately geo-positioned as a result of the van having precision GPS and other position and orientation determination equipment onboard. While driving the road network, image sequences are being captured.

The mobile mapping vehicles record more then one image sequence of the object, e.g. a building or road surface, and for each image of an image sequence the geo-position is accurately determined together with the orientation data of the image sequence. Image sequences with corresponding geo-position information will be referred to as geo-coded image sequences. Other data may also be collected by other sensors, simultaneously and similarly geo-coded. For example, a laser scanner could be used to collect laser scanner data. High resolution laser scanners provide laser scanner data which enables an engineer to automatically detect objects from the laser scanner data. A high resolution laser scanner has a resolution, along the plane of the scan, of 0.1 degree and a scanning frequency of 300 Hz. However, high resolution laser scanners are expensive which discourages their usage in common terrestrial measurements.

The analysis of the image sequences is very time consuming and costs a lot of processing power due to the vast amount of data to be processed. Furthermore, high resolution laser scanner data is only suitable to detect objects by form, shape or position.

SUMMARY OF THE INVENTION

The present invention seeks to provide an improved method of automatically detecting objects from terrestrial based mobile mapping data, including laser scanner data that could be obtained by a low resolution laser scanner device.

According to the present invention, the method comprises:
retrieving a position and orientation of the vehicle;
filtering the laser scanner data in dependence of the position and orientation of the vehicle to obtain laser points corresponding to regions of interest;
retrieving a source image associated with the position and orientation of the vehicle;
mapping the laser points corresponding to the regions of interest to image coordinates of the source image to generate a recognition mask;
combining the recognition mask and the source image to obtain candidate 3D images representative of the regions of interest; and,
detecting a group of objects from the candidate 3D images.

The invention is based on the recognition that the colors of pixels of images taken by a digital camera correspond to the colors of each nearest surface point that are in direct view of the camera and laser data from a laser scanner device correspond to the distance between the laser scanner device and a surface point reflecting the laser beam. Typically, lenses used in today's cameras have resolutions and focal lengths that take a picture with an angular resolution at about 0.01-0.1 degrees per pixel. For each direction that it is pointed, a laser scanner device detects and calculates the distance between the laser scanner device and a surface point of an obstacle reflecting the laser beam. The angular resolution of the laser scanner device of the current invention is about 1 degree. Both the output of a digital camera, the color of a pixel, and the output of a laser scanner device, the distance between the laser scanner and a surface point, have been measured via the shortest path between a surface point and a sensor. Therefore, the outputs could be combined to improve the recognition of objects in source images by taking into account for the respective pixels 3-dimensional (3D) position information obtained by the laser scanner device. From the laser scanner data a 3D representation of the captured surfaces can be made. The images and laser data captured by a mobile mapping vehicle comprises both associated position and orientation data in a coordinate reference system. This enables us to generate from the individual laser points that have been taken at different time instances a 3D-representation of the environment of the road the vehicle is driving on. As the position and orientation of the camera and the selected laser points use the same coordinate reference system. The selected laser points can be projected by means of trigonometry on the coordinate system of an image. In this way the 3D laser scanner point can be projected to image space. Furthermore, road signs, speed limits, traffic lights, direction signposts etc, should be visible from the road and within a predefined road corridor. The predefined road corridor defines regions of interest in the laser data. The regions of interest could be obtained by excluding laser scanner samples from the laser scanner data which for sure could not be associated to an object of interest. An object of interest could be a road sign, a traffic light, a direction signpost, a bill board etc. For example, a road sign is always at least between 0.5 m and 6 m above the ground. Furthermore, with respect to the position of the digital camera, it could be said that an object of interest is always lying 10 m to the left and the right of the camera and that to identify the type of road sign in a source image, the road sign must lie within 0.5-30 m in front of the camera. This knowledge enables us to define a filter to select only the laser points from the laser scanner data that might correspond to an object we are looking for. The filtering reduces the amount of laser points to be further processed. By identifying regions of interest in the source images, the amount of image data to be analyzed to recognize an object could be tremendously reduced. Both the filtering of laser data and analyzing only the pixels corresponding to regions of interest in an image reduces the time to process all the data captured during a mobile mapping session. Furthermore, the laser scanner data could be used to segment the source images, wherein each segment corresponds to a contiguous or flowing surface. This improves the recognition processes and reduces the possibility that an object is detected erroneously.

In a further embodiment of the invention combining comprises:
   segmenting the source image in dependence of the recognition mask to obtain intermediate candidate images;
   adding depth information corresponding to the laser points of regions of interest to corresponding pixels of said intermediate candidate images to obtain the candidate 3D images.

These features enable us to process very efficiently a source image. The source image are split up into multiple images having a very limited amount of pixels and which comprises depth information. By means of the depth information the candidate 3D images could be very efficiently scaled to real world size. Furthermore, the depth information enables us to calculate the real world sizes of the object represented by the candidate 3D image.

In a further embodiment of the invention detecting comprises for each candidate 3D image:
   determine size and shape of candidate 3D image in dependence of said depth information;
   if size and shape are according to predefined values, determine the depth consistency of the candidate 3D image surface in dependence upon the depth information;
   if the candidate 3D image surface is depth consistent, determine perpendicularity of candidate 3D image to the driving direction in dependence of depth information;
   if the candidate 3D image surface is not depth consistent, determine perpendicularity of candidate 3D image to the driving direction in dependence of a previous source image;
   add candidate 3D image in dependence of perpendicularity to the group of objects.

These features enable the engineer practicing the invention to very efficiently determine whether the candidate 3D image corresponds to the road sign or not.

In another embodiment of the invention filtering comprises:
   selecting laser points corresponding to a surface in the regions of interest in dependence of the driving direction and the local depth consistency of the laser scanner data; and combining comprises:
   segmenting the source image in dependence of the recognition mask to obtain intermediate candidate images;
   adding depth information corresponding to the laser points corresponding to the surface to corresponding pixels of said intermediate candidate images to obtain the candidate 3D images. These features enable us to determine in a very early stage whether or not a cluster of laser samples corresponds to an object of interest which results in a further reduction of laser points be processed. This reduces subsequently the amount of intermediate images. This is especially achieved by taking into account the perpendicularity of a surface of the object of interest with respect to the driving direction of the vehicle. The driving direction of the vehicle serves as an approximation to the direction of the road. The computing effort is further reduced as a segment comprises a limited amount of pixels, the number of segments is reduced and no verification of the orientation of the object represented by the intermediate image has to be performed.

In a further embodiment of the invention, detecting comprises for each candidate 3D image:
   determine size and shape of candidate 3D image in dependence of said depth information;
   add candidate 3D image in dependence of size and shape to the group of objects. This feature enables the engineer practicing the invention to scale efficiently the candidate 3D image to obtain the real world size and shape of the object. Subsequently, the shape is measured and only candidate 3D images having a corresponding shape and size are added to a group of objects, which group could be stored in a database. In an embodiment only objects with a planar surface are detected.

In another embodiment of the invention, the method comprises:
the method comprising:
   retrieving a position and orientation of the vehicle;
   filtering the laser scanner data in dependence of the position and orientation of the vehicle to obtain laser points corresponding to obtain first regions of interest;
   retrieving a source image associated with the position and orientation of the vehicle;
   mapping the laser points corresponding to the first regions of interest to image coordinates of the source image to generate a first recognition mask;
   combining the first recognition mask and the source image to obtain first candidate 3D images representative of the first regions of interest;
   detecting a first group of objects in dependence of the driving direction from the first candidate 3D images;
   filtering the laser scanner data in dependence of the position and orientation of the vehicle and the local depth consistency of the laser scanner data to obtain laser points corresponding to second regions of interest;
   mapping the laser points corresponding to the second regions of interest to image coordinates of the source image to generate a second recognition mask;
   combining second recognition mask and the source image to obtain second candidate 3D images representative of the second regions of interest;
   detecting a second group of objects from the second candidate 3D images; and
   combining the first and second group of objects. This embodiment enables us to improve the detection rate of the objects from the mobile mapping data.

The present invention can be implemented using software, hardware, or a combination of software and hardware. When all or portions of the present invention are implemented in software, that software can reside on a processor readable storage medium. Examples of appropriate processor readable storage medium include a floppy disk, hard disk, CD ROM, DVD, memory IC, etc. When the system includes hardware, the hardware may include an output device (e.g. a monitor, speaker or printer), an input device (e.g. a keyboard, pointing device and/or a microphone), and a processor in communication with the output device and processor readable storage medium in communication with the processor. The processor readable storage medium stores code capable of programming the processor to perform the actions to implement the present invention. The process of the present invention can also be implemented on a server that can be accessed over telephone lines or other network or internet connection.

SHORT DESCRIPTION OF DRAWINGS

The present invention will be discussed in more detail below, using a number of exemplary embodiments, with reference to the attached drawings, in which FIG. 1 shows a representation of the laser scanner data in world coordinates;

DETAILED DESCRIPTION OF EXEMPLARY EMBODIMENTS

Figure 12:
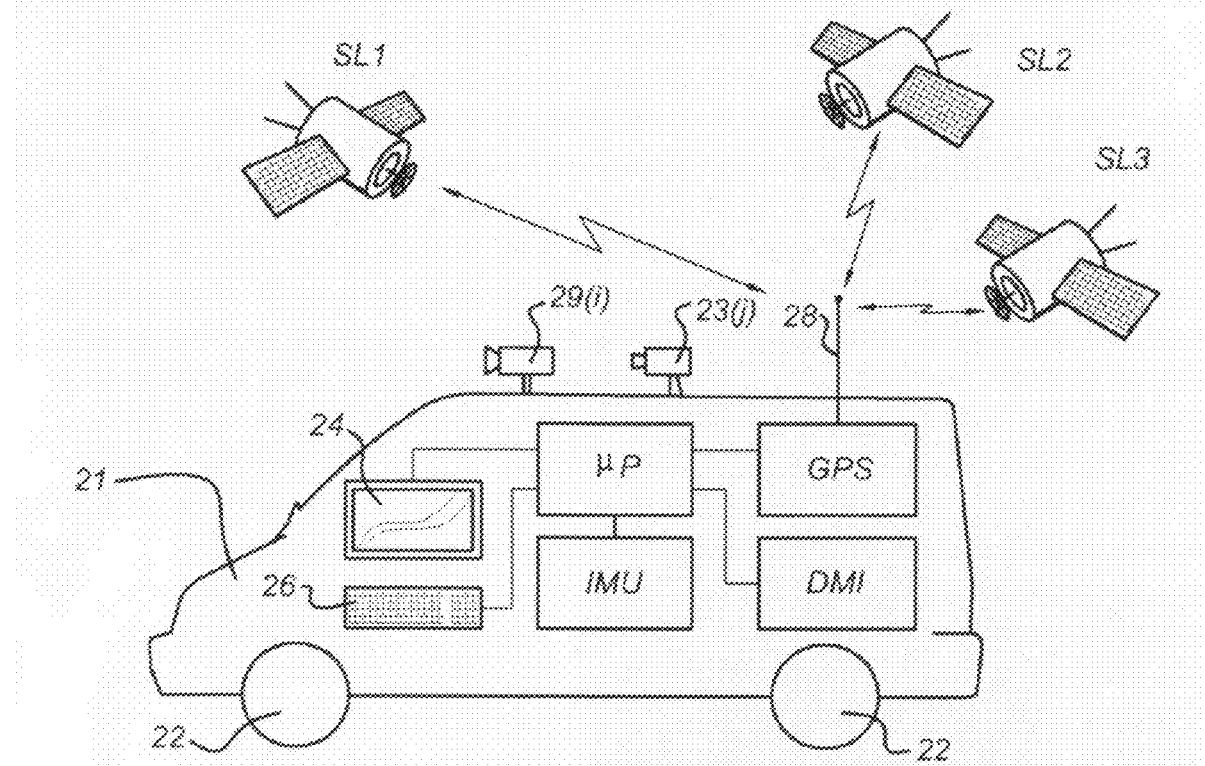
FIG. 12 shows a MMS system with a camera and a laser scanner.
Figure 13:
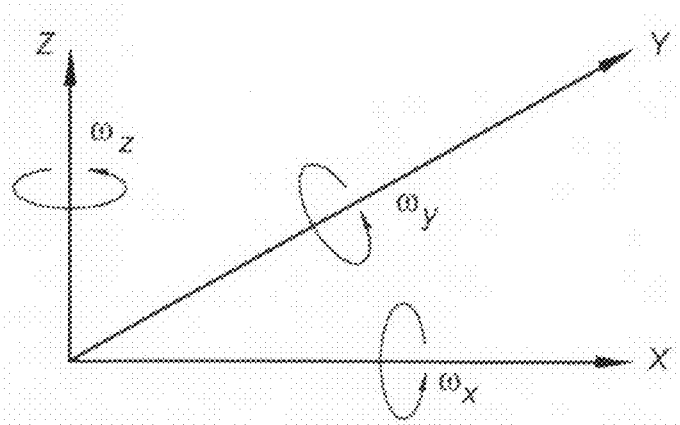
FIG. 13 shows a diagram of location and orientation parameters.

FIG. 12 shows a MMS system that takes the form of a car 20. The car 20 is provided with one or more cameras 29($i$), i=1, 2, 3, . . . I and one or more laser scanners 23($j$), j=1, 2, 3, . . . J. The looking angle or the one or more cameras 29($i$) can be in any direction with respect to the driving direction of the car 21 and can thus be a front looking camera, a side looking camera or rear looking camera, etc. The viewing window(s) of the camera(s) 29($i$) cover(s) the whole road surface in front the vehicle. Preferably, the angle between the driving direction of the car 21 and the looking angle of a camera is within the range of –45 degree –45 degree on either side. The car 21 can be driven by a driver along roads of interest.

The car 21 is provided with a plurality of wheels 22. Moreover, the car 21 is provided with a high accuracy position determination device. As shown in FIG. 12, the position determination device comprises the following components:

a GPS (global positioning system) unit connected to an antenna 28 and arranged to communicate with a plurality of satellites SLi (i=1, 2, 3, . . . ) and to calculate a position signal from signals received from the satellites SLi. The GPS unit is connected to a microprocessor µP. Based on the signals received from the GPS unit, the microprocessor µP may determine suitable display signals to be displayed on a monitor 24 in the car 1, informing the driver where the car is located and possibly in what direction it is traveling. Instead of a GPS unit a differential GPS unit could be used. Differential Global Positioning System (DGPS) is an enhancement to Global Positioning System (GPS) that uses a network of fixed ground based reference stations to broadcast the difference between the positions indicated by the satellite systems and the known fixed positions. These stations broadcast the difference between the measured satellite pseudoranges and actual (internally computed) pseudoranges, and receiver stations may correct their pseudoranges by the same amount.

a DMI (Distance Measurement Instrument). This instrument is an odometer that measures a distance traveled by the car 21 by sensing the number of rotations of one or more of the wheels 22. The DMI is also connected to the microprocessor µP to allow the microprocessor µP to take the distance as measured by the DMI into account while calculating the display signal from the output signal from the GPS unit.

an IMU (Inertial Measurement Unit). Such an IMU can be implemented as three gyro units arranged to measure rotational accelerations and translational accelerations along three orthogonal directions. The IMU is also connected to the microprocessor µP to allow the microprocessor µP to take the measurements by the DMI into account while calculating the display signal from the output signal from the GPS unit. The IMU could also comprise dead reckoning sensors.

It will be noted that one skilled in the art can find many combinations of Global Navigation Satellite systems and on-board inertial and dead reckoning systems to provide an accurate location and orientation of the vehicle and hence the equipment (which are mounted with know positions and orientations with references to a reference position and orientation of the vehicle).

The system as shown in FIG. 21 is a so-called "mobile mapping system" which collects geographic data, for instance by taking pictures with one or more camera(s) 29($i$) mounted on the car 21. The camera(s) 29($i$) are connected to the microprocessor µP. The camera(s) 29($i$) in front of the car could be a stereoscopic camera. The camera(s) could be arranged to generate an image sequence wherein the images have been captured with a predefined frame rate. In an exemplary embodiment one or more of the camera(s) are still picture cameras arranged to capture a picture every predefined displacement of the car 21 or every interval of time. The camera(s) 29($i$) send the images to the µP. In an embodiment, the mobile mapping vehicle comprises three cameras, one front looking camera and a camera at each side having a looking axis within a range of 30-60 degree and preferably 45 degree, with respect to the heading direction of the vehicle. In that case, the front looking camera captures images especially suitable for detecting road directions above the road surface and the side looking cameras captures images especially suitable for detecting objects, such as road signs, along the road.

Moreover, the laser scanners 23($j$) take laser samples while the car 21 is driving along roads of interest. The laser samples, thus, comprise data relating to the environment associated with these roads of interest, and may include data relating to building blocks, to trees, traffic signs, parked cars, people, direction signposts, etc. The laser scanners 23($j$) are also connected to the microprocessor µP and send these laser samples to the microprocessor µP.

It is a general desire to provide as accurate as possible location and orientation measurement from the three measurement units: GPS, IMU and DMI. These location and orientation data are measured while the camera(s) 29($i$) take pictures and the laser scanners 23($j$) take laser samples. Both the pictures and laser samples are stored for later use in a suitable memory of the μP in association with corresponding location and orientation data of the car 21, collected at the same time these pictures were taken. The pictures include visual information, for instance, as to building blocks, to trees, traffic signs, parked cars, people, direction signposts, etc. The laser scanners 23(j) provide a cloud of laser scanner points dense enough to visualize in a 3D representation of along the road information, such as building blocks, trees, traffic signs, parked cars, people, direction signposts, etc. In an embodiment, the laser scanner(s) 23(j) are arranged to produce an output with minimal 50 Hz and 1 deg resolution in order to produce a dense enough output for the method. A laser scanner such as MODEL LMS291-S05 produced by SICK is capable of producing such output.

Figure 1:
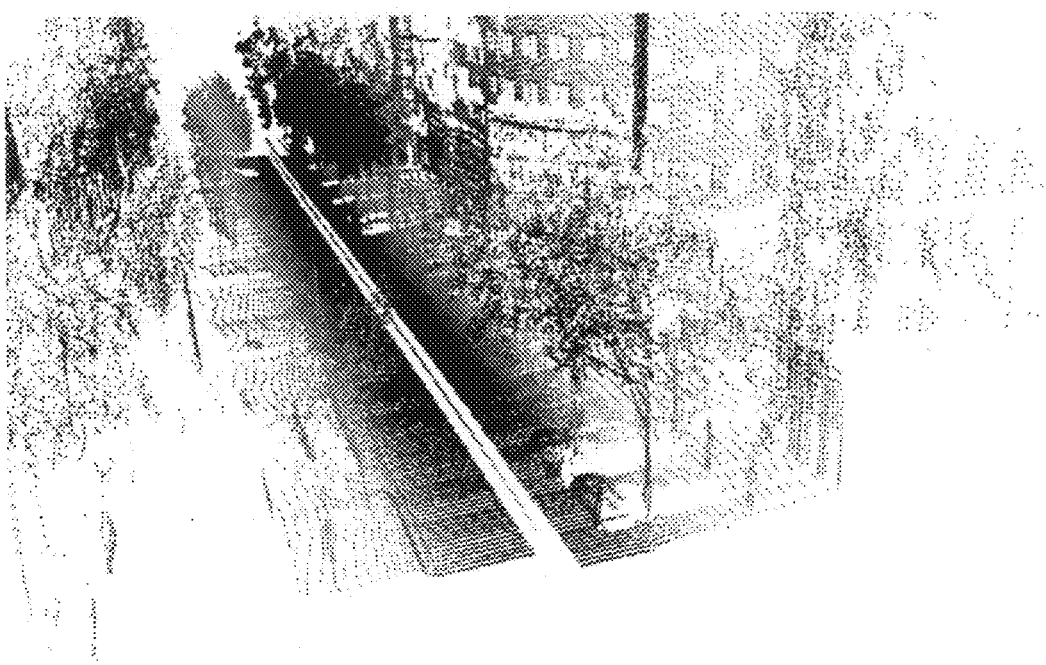
Figure 2:
FIG. 2 shows an image associated with the representation in FIG. 1.

FIG. 2 shows which position signals can be obtained from the three measurement units GPS, DMI and IMU shown in FIG. 1. FIG. 2 shows that the microprocessor μP is arranged to calculate six different parameters, i.e., three distance parameters x, y, z relative to an origin in a predetermined coordinate system and three angle parameters $\omega_x$, $\omega_y$, and $\omega_z$, respectively, which denote a rotation about the x-axis, y-axis and z-axis respectively. Preferably, the z-direction coincides with the direction of the gravity vector. The global UTM or WGS84 coordinate reference system could be used as predetermined coordinate reference system. It should be noted that the method according to the invention can be used with a local coordinate reference system, such as NAD 83 and other national grid systems. The six different parameters provide the 6-degree of freedom which is needed to track the position and orientation of the vehicle in time. The camera(s) and laser scanners have a fixed position and orientation with respect to the car 21. This enables us to determine accurately from the six parameters the position of each laser sample in the coordinate reference system and the position and orientation of the camera in the coordinate reference system at the moment of taking an image.

FIG. 1 shows a representation of laser scanner data in real world coordinates. A laser scanner detects and calculates the distance between the laser scanner and a first obstacle. The laser scanner rotates a laser beam and obtains each time a sample after a rotation over a predefined angle. The rotation speed in combination with the sampling rate defines the angular resolution of the laser scanner data. In the present invention a laser scanner has a resolution, along the plane of the scan, of 1 degree and a scanning frequency of 75 Hz. This results in a laser scanner vertical resolution of 25 cm, at a distance of 15 m which corresponds to the average distance to a sign. The laser scanner data comprises samples which are given by triplets (t,d,a), where t is time of sample, d is distance to nearest surface, a is the angle of the laser at the time of measurement. The laser scanner is preferably mounted at the front of a mobile mapping vehicle. The rotation axis of the laser scanner is preferably parallel to the road surface. For optimal detection of objects having a planar surface it has been found that the rotation axis has preferably an angle of 45 degrees with respect to said planar object. The main objective of the invention is to extract road signs and direction signposts from mobile mapping data. Mobile mapping data include all the data recorded by a mobile mapping system in a mobile mapping vehicle. Road signs and direction signposts are objects having a planar surface perpendicular to the axis of a road. Therefore, best mounting of the laser scanner to detect said objects of interest is 45 degrees to the driving direction of the mobile mapping vehicle.

A mobile mapping vehicle is equipped with a positioning platform comprising positioning sensors, e.g. a GPS-receiver and possibly additional inertial and dead reckoning sensors, and orientation sensors, e.g. gyroscopes, accelerometers and distance measurement unit. These sensors are commonly known. With these sensors the position and orientation of the vehicle can be determined very accurately and recorded. Furthermore, the mobile mapping vehicle is equipped with a number of cameras to record image sequences. Two cameras could be mounted in front of the vehicle to record the images in front of the vehicle. These two cameras can be arranged to generate a sequence of stereoscopic image pairs. Furthermore, cameras could be mounted at the left and right side to obtain side views from the vehicle and the camera at the rear of the vehicle to record the living world seen from the rear of the vehicle. If cameras are mounted on all sides of the vehicle a continuous view in all directions around the vehicle could be obtained. A camera in front and at the rear enables us to obtain two image sequences of the same road surface but from opposite directions.

All the recorded data source, comprising at least the positioning and orientation data, laser scan data and image sequences, use the same time reference. The positioning platform enables us to determine very accurately the position and orientation of the mobile mapping vehicle. Furthermore, the laser scanner is mounted on the vehicle at a known position and with a known orientation with respect to the driving direction of the vehicle. By combining the position and orientation of the vehicle, the position and orientation of the laser scanner with respect to the position of the vehicle and the scanner data, recorded in triplets, the laser scanner data can be transformed into 3D world coordinates. This gives a mesh of nearest points in the given direction to the vehicle movement. FIG. 1 shows the result of transforming the triplets of the laser scanner data into 3D world coordinates. The laser data represented in FIG. 1 has been obtained by two laser scanners. Each of the laser scanners has a measuring window of 180 degrees and has a rotation axis which is parallel to the driving direction of the vehicle. All figures in this description use said configuration of laser scanners. In this application the driving direction is an approximation of the direction of the road. As a road sign is normally placed with an angle of 5 degrees with respect to the driving direction and not perpendicular to the driving direction, the road sign could be detected with a laser with a rotation axis parallel to the driving direction (this is the configuration of the data collected for FIG. 1). However, it has been found that a laser scanner having a rotation axis which has an angle of 45 degree with respect to the driving direction provides laser data which is more suitable for detecting objects, such as road signs and building facades. The darkness of a sample in FIG. 1 is representative to the distance between the laser scanner and the reflecting surface.

FIG. 2 shows a source image associated with the representation given in FIG. 1. The source images represent more or less vertical images which are recorded by a terrestrial based camera. The source images could be a sequence of still pictures recorded by means of a still picture camera, which is triggered every displacement of e.g. 10 meter. A camera comprising the image sensor has an angle of view α. The angle of view α is determined by the focal length of the lenses of the camera. The angle of view α could be in the range of 45°<α<180°. Furthermore, the camera has a looking axis, which is in the centre of the angle of view. The looking axis is parallel to a horizontal plane, for example the road surface. In the example of FIG. 2, the looking axis is parallel to the vehicle's direction of motion. Normally, the image sensor is mounted perpendicular to the looking axis. In this case, the image sensor records "pure" vertical source images. Further the height of the image sensor is known with respect to the horizontal plane, e.g. the earth surface. By means of trigonometry, the source image retrieved from the terrestrial based camera can be converted to any virtual plane. Even if the looking axis is angled with a known angle with respect to the horizontal plane, the virtual plane can be obtained for a source image.

An image taken by a still picture camera is a representation of the colors of the nearest surface points that are in view of the camera. The value of a pixel corresponds to the color of the surface that will be seen from the focal point of the camera via the light sensitive element of the image sensor measuring the color for said pixel. Typically lenses used in today's cameras, have resolutions and focal lengths that record a picture with an angular resolution at about 0.01-0.1 degrees per pixel.

The angular resolution of a still picture camera is about 10 to 100 times finer than that from a laser scanner. The camera currently used on a mobile mapping vehicle has a pixel resolution of 0.05 degrees, which is 20 times finer than the angular resolution of the laser scanner used.

The present invention combines both the laser scanner data and a source image to extract objects of interest from the mobile mapping data. A characteristic of the present invention is that the laser scanner data is captured at different time instances and the source image at a particular time instance. The position and orientation data of the vehicle is essential to be able to project a 3D position of a laser sample in absolute or relative geo-graphic coordinate reference system on a x,y pixel position of a source image. The time references associated with the position and orientation data of the vehicle, the respective source images and laser scanner data enables a microprocessor to determine for each source image metadata defining a reference position and orientation in the coordinate reference system and for each laser sample the position in the coordinate system. This enables us to project the laser scanner samples into image space.

A first embodiment of the invention comprises the following actions:
1. select regions of interest for laser scanned points;
2. map laser regions of interest to an image, generating a recognition mask;
3. segment region of interest;
4. filter segments by size and shape characteristics;
5. determine whether segment is occluded;
5a. calculate orientation of any occluded segments using the 6 degrees of freedom orientation system;
5b. calculate orientation of non-occluded segments from laser data;
6. select by means of filtering the perpendicular segments.

In a second embodiment of the invention the method comprises the following actions:
1. select regions of interest of laser scanned points;
7. extract perpendicular surfaces from regions of interest;
8. map perpendicular surfaces to images;
9. perform color separation on image corresponding to surfaces;
10. select, by means of filtering, surfaces by size and shape.

The respective actions of the first and second embodiment will be discussed in more detail below.

Figure 3:
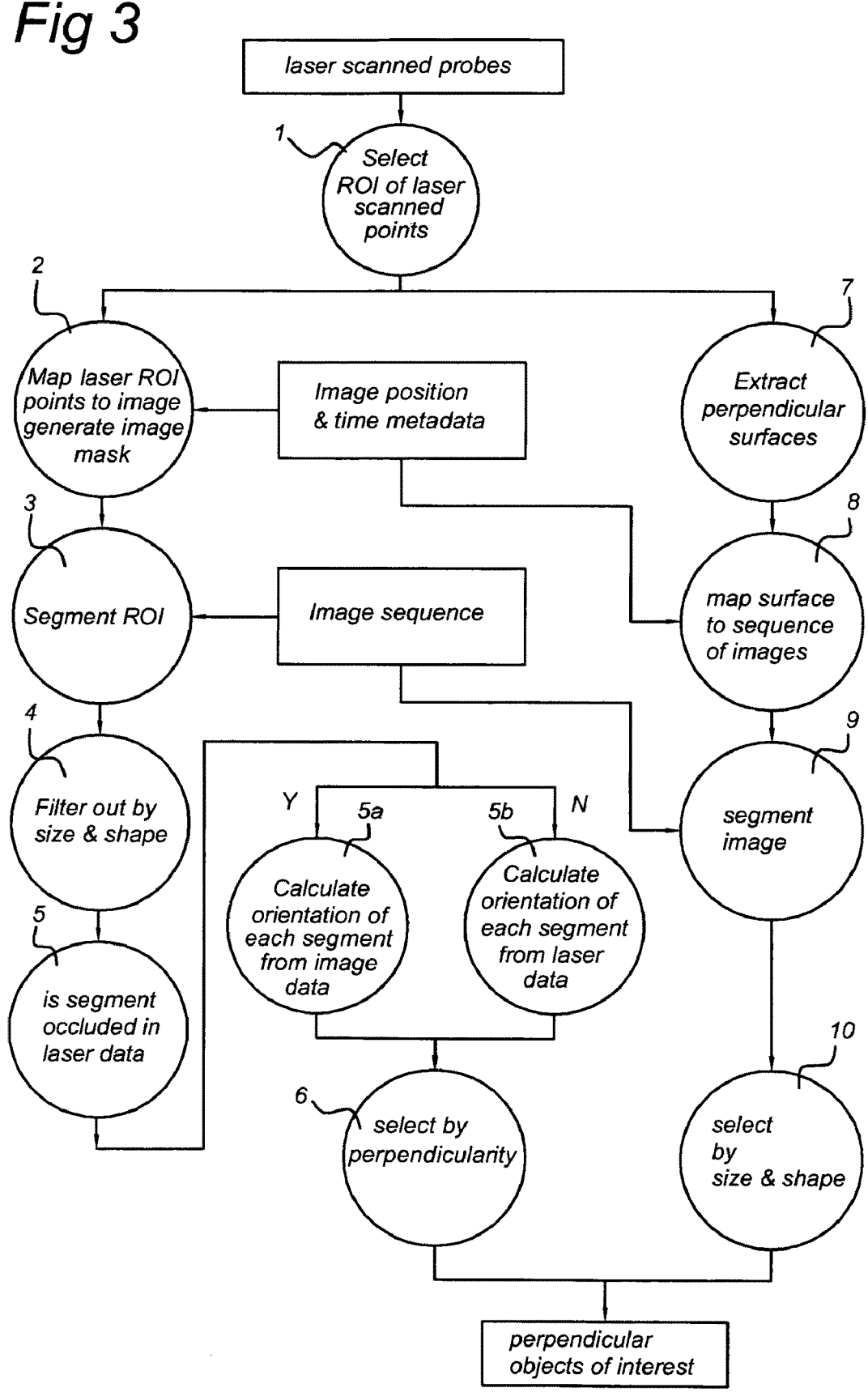
FIG. 3 is a flow diagram of an embodiment of the method according to the invention.
Figure 11:
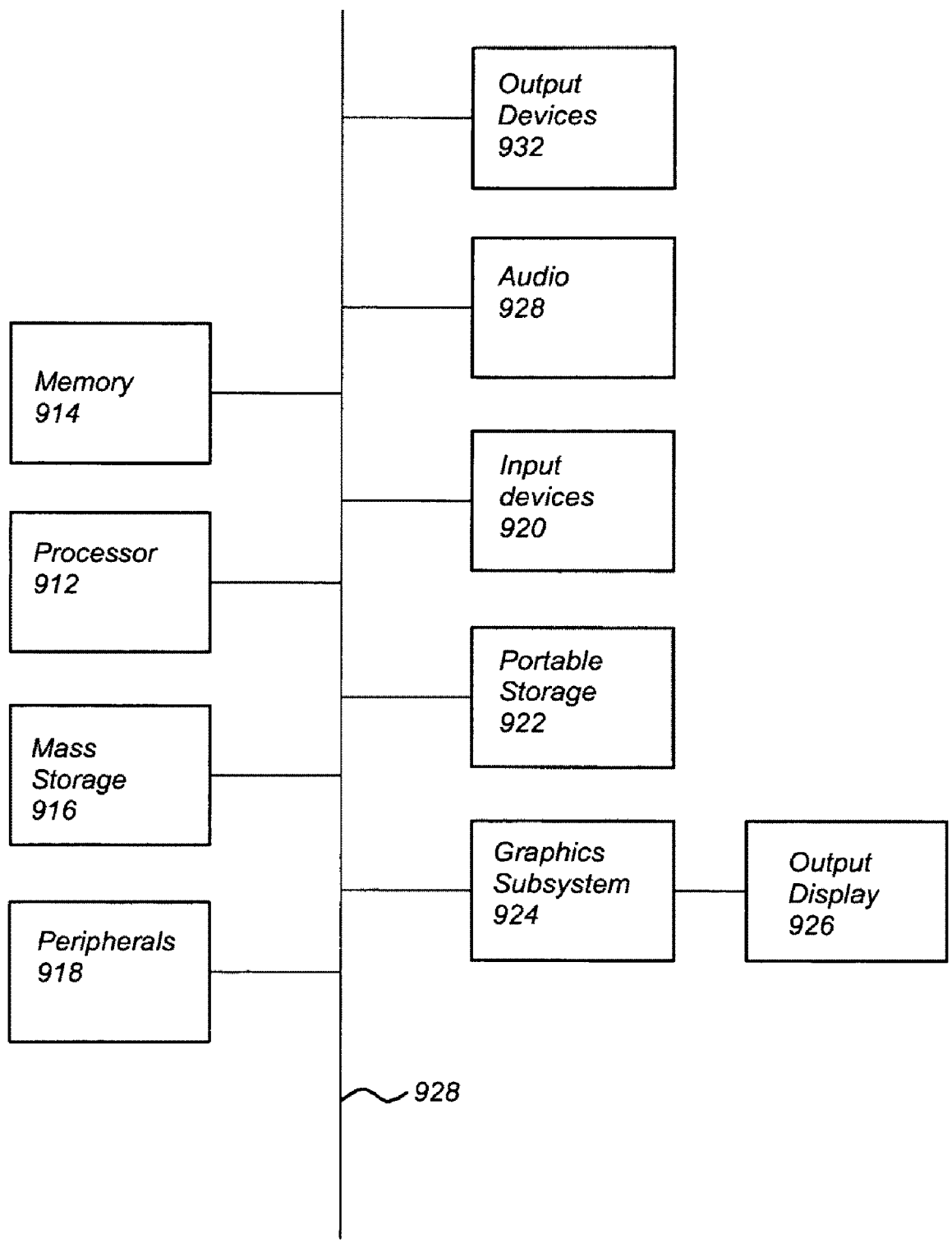
FIG. 11 illustrates a high level block diagram of a computer system which can be used to implement the method according to the invention.

FIG. 3 is a flow diagram of a third embodiment of the method according to the invention. In the third embodiment the first and second embodiments have been combined. The left path corresponds to the first embodiment and the right path corresponds to the second embodiment. It has been found that the first embodiment and second embodiment perform uncorrelated processes. The method according to the first embodiment, which is based on image based recognition of planar objects enables us to detect 98% of the objects, with a false positive rate on the order of 0.01%. The method according to the second embodiment, which is based on recognition of planar objects in laser scanner data, enables us to detect 80% of the objects with a similar rate of false positives. As the recognition processes are uncorrelated, the recognition results are uncorrelated. As a result the second method will find 80% of the not detected objects by the first method and the first process will find 98% of the not detected objects by the second method. Therefore, by combining the results of the first and second methods, recognition of 99.6% of the objects can be achieved. Such performance enables the process to be automated. The advantage of combining the two embodiments is illustrated in FIG. 11.

The following description will disclose the actions of the first embodiment in more detail.

Action 1. Select Regions of Interest for Laser Scanned Points.

In this action for each image the laser points are filtered to provide a region of interest. A region is a portion of the laser scanner data represented by a set of points. Each image has associated position and orientation data. The laser points also have associated position and orientation data. All laser scanner points which for sure do not correspond to a surface of an object of interest are filtered out. An example of such a filter might be:
  all points which are further than 10 m to the left and/or to the right of the position of the mobile mapping vehicle;
  all point which are below 0.5 m and/or above 6.0 m height above the road surface;
  all point which are outside 0.5-30 m distance in front of the camera or mobile mapping vehicle.

This action limits the amount of laser points to be processed for each image dramatically. The laser points corresponding to a region of interest for an image comprises thus only the laser points that are not filtered out and that could be from an as yet to be recognized object. Thus, the laser points corresponding to a region of interest for an image are a subset of the laser scanner data.

Figure 4:
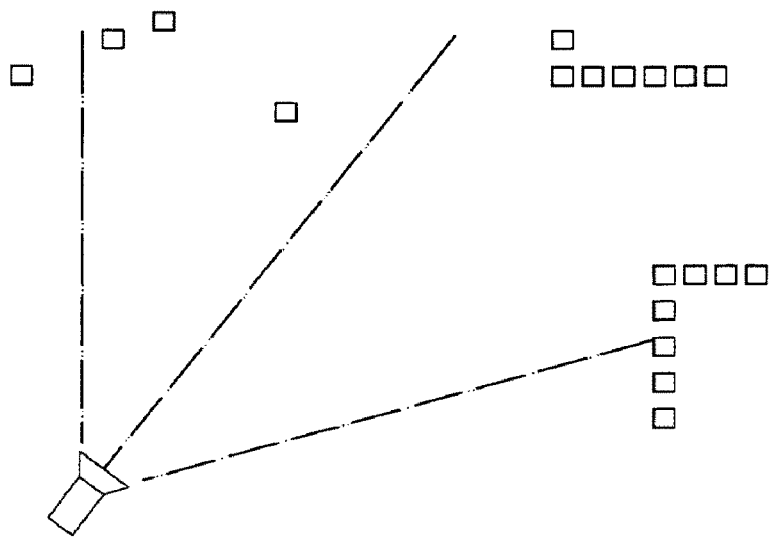
FIG. 4 shows a top view of the laser point projection to camera space.
Figure 5:
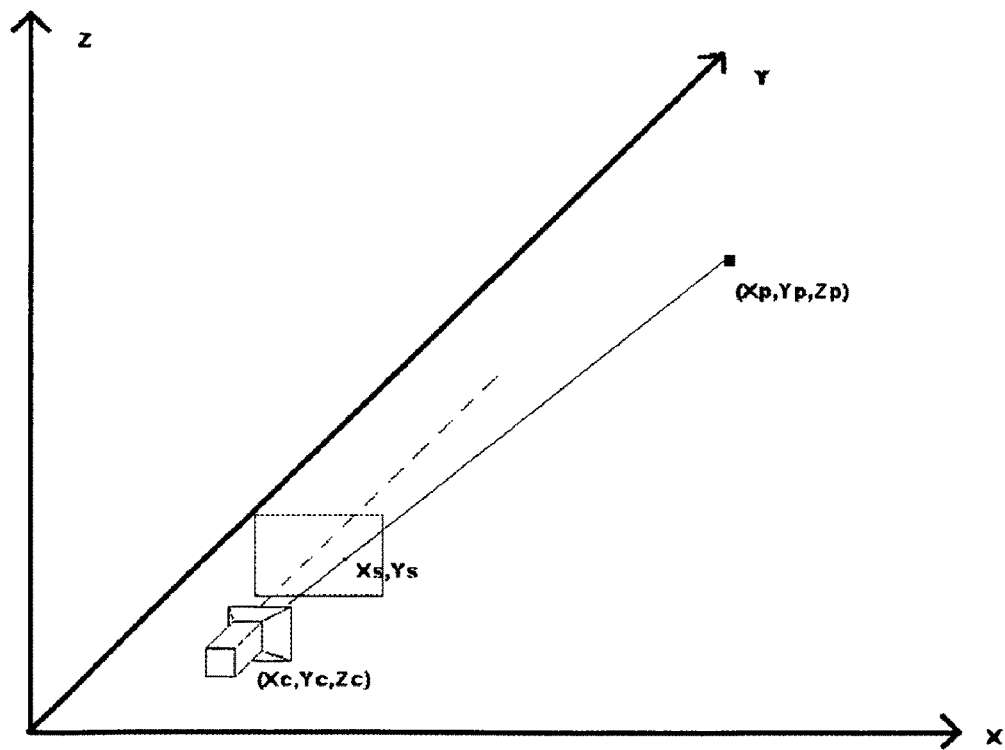
FIG. 5 shows a laser point to image pixel transformation.

Action 2. Map Laser Regions of Interest to Image, Generating a Recognition Mask;

In this action the laser points of the region of interest for each image on which recognition should be performed are mapped to image coordinates. This could be done as the position of the focus point of each picture is known and the orientation of the camera is known. The image space of a camera is defined by the viewing axis and the horizontal and vertical viewing angle. FIG. 4 shows a top view of example laser point projection to camera space. Only the laser points that are within the camera viewing angle are projected into image space. In FIG. 4, one point from left and three points from right side are those which will not be projected to image space. FIG. 5 shows the transformation of a laser point (Xp, Yp, Zp) to an image pixel (Xs, Ys). (Xp, Yp, Zp) are the coordinates of the laser point in world coordinates, (Xc, Yc, Zc) are the coordinates of the focus point of the camera in world coordinates and (Xs, Ys) are the coordinates in image space. The dashed line corresponds to the looking axis of the camera.

Figure 6:
FIG. 6 shows the image of FIG. 2 with an overlay of projected laser points of FIG. 1.

In an embodiment, world coordinates of the camera are assigned to each captured picture. Furthermore, with the benefit of the Mobile Mapping Platform's position and orientation sensors, all the rotations of the camera and the laser scanner with respect to a reference orientation of the vehicle are known very accurately. In combination with the measured position and driving direction in time, the real world coordinates of the laser points can be determined with respect to the viewing axis of the camera. This enables us to select and project the laser points to the image space very accurately which is key to the invention. This is particularly important, in that the points from the laser scanner can be taken at different times than when the image was collected and the position and orientation of the platform must be accurately taken into account to gain the level of precise registration needed for the present invention. FIG. 6 discloses the image of FIG. 2 wherein the laser points are projected to the image space of said image. However, only the laser points that were not filtered by the first action and therefore could be from an object are used to generate a mask which enables us to select very efficiently only the corresponding pixels from the source image. The mask has an image space corresponding to the source image. This enables us to define a one-to-one relationship between a mask pixel and a source image pixel.

Figure 7:
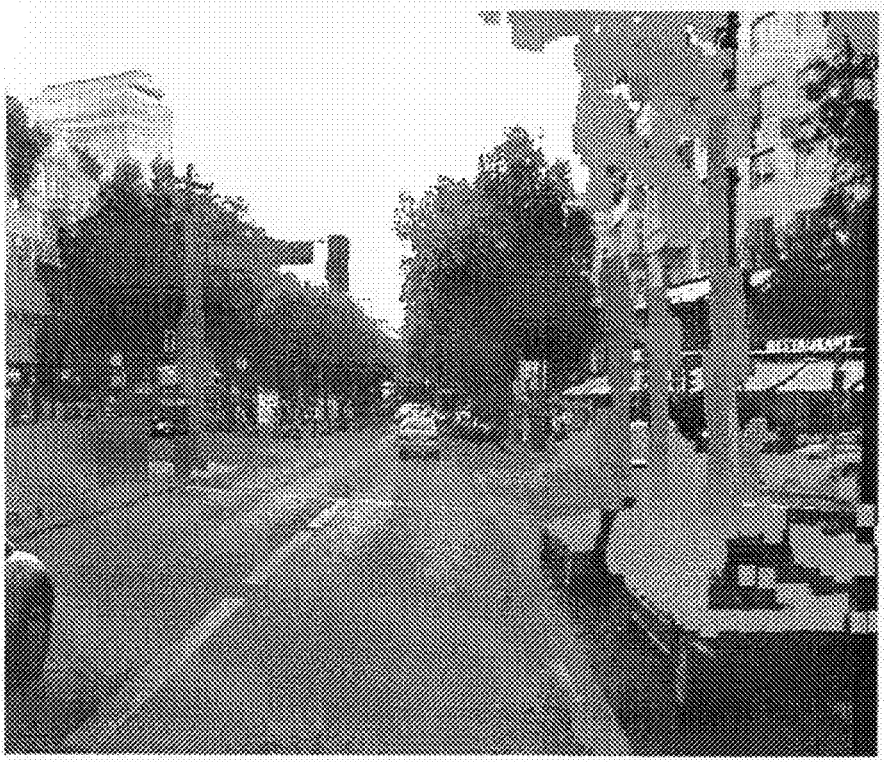
FIG. 7 shows the image of FIG. 2 with an overlay of dilated projected laser points of interest.
Figure 8:
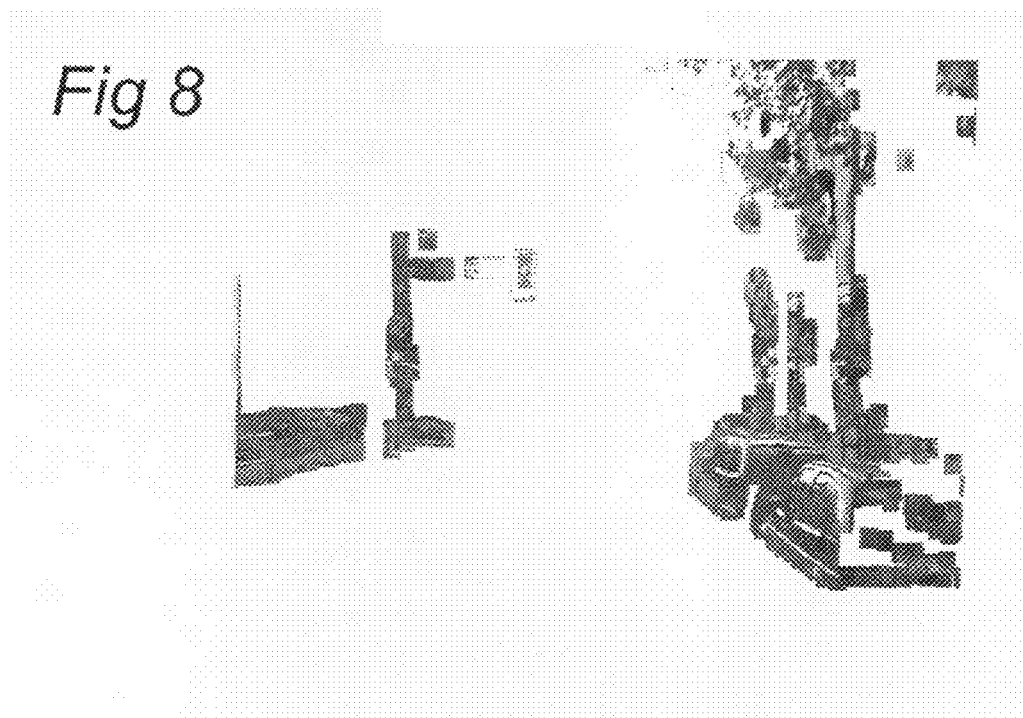
FIG. 8 shows only the regions of interest in the image of FIG. 2.

Due to the difference in resolution of the laser scan device and camera, laser points will normally result in individual dots in the mask. Therefore, laser scanner points will have sparse occurrence in the mask. To generate contiguous areas in the mask, the pixels corresponding to the laser points are dilated by means of well known morphological image based filters. In a simple embodiment all laser points are replaced by a squared area having a fixed length and height (in number of pixels), roughly derived from its resolution and geometrical characteristics. FIG. 7 discloses the image that has been obtained after applying the region of interest filter on laser points and dilation of the pixels of the mask corresponding to the filtered laser points.

Experimental results show that the operation described above enables us to discard 85-95% of the pixels of the source image, leaving only those "valuable" pixels which are suspected to represent road signage. By reducing the pixels in the source images to be examined to only the valuable pixels, the number of false positives, which correspond to erroneous detection of objects, is reduced proportionally to the ratio of valuable pixels to total pixels. Furthermore, the speed of processing the images in subsequent processing steps is reduces with the same ratio.

It should be noted that depth information could only be attached to the pixels that have a corresponding laser scanner sample. In an embodiment, the value of the depth information of the other pixels of the mask will correspond to "no depth information". Accordingly, the depth information will have a sparse occurrence in the image space. In another embodiment, the depth information is assigned simultaneously with the dilation process. In this way, all pixels of the mask will have depth information.

Action 3. Segment Region of Interest;

In this action the pixels of a source image corresponding to the mask generated in action 2 are selected. Subsequently, on the selected pixels a "growing" algorithm is performed to segment the selected pixels. A growing algorithm enables the engineer skilled in the art, to generate a segment or candidate 3D image. As a result all the pixels that are neighboring pixels of the segment in the source image have a color distance outside a predefined threshold value and all the pixels of the segment have a color distance within the predefined threshold value. In this step the mask image is used to generate candidate 3D images, wherein each candidate 3D image corresponds to one segment. For example, a speed limit sign indicating a speed limit of 80, will be segmented into 7 segments resulting in 7 candidate 3D images, one for the red border, one for the white background around the numbers, one segment for the black area of the 8 sign and one area for the black area of the 0 sign and two segments for the white areas in the 8 sign and one segment for the white area in the 0 sign. Each pixel of a candidate 3D image comprises the color information from the source image and associated depth information from the mask. In literature such a pixel is called a voxel.

In an embodiment the depth information of a pixel is the minimum distance in real world coordinates between the focal point of the camera and the plane perpendicular to the looking axis of the camera comprising the laser scanner point associated with said pixel. In another embodiment the depth information of a pixel is the distance in real world coordinates between the focal point of the camera and the laser scanner point associated with said pixel.

Each of the candidate 3D images will be processed in the subsequent processing actions. Please note that recognizing the presence of only one major segment of the sign is relevant to further processing of the signage information. The major segment is a segment with the highest number of pixels or characteristic predefined shape and size. E.g. for European speed limit signage, it would be a red circle with interior: for warning signs it would be a red triangle with interior etc.

In another embodiment the pixels of the mask are used as starting pixels in the source image. The growing algorithm is performed on the source image to obtain the candidate 3D image. This embodiment is advantageous for the situation wherein a part of a direction signpost is occluded due to an object between the laser scanner during some of the scans whereas the whole signpost is visible in an image. It should be clear that other algorithms could be used to obtain candidate 3D images from the combination of the mask and the source image.

Action 4. Filter Segments by Size and Shape Characteristics.

In this action on each candidate 3D image a size and shape filter is applied. The depth information is used to scale the areas of pixels of the candidate 3D image having similar depth information to real world size in there corresponding real world position. If a segment is associated with multiple depths, for each depth the size of the corresponding area is determined. The determined size(s) are used to determine whether a candidate 3D image has predetermined size. Candidate 3D images which are larger or smaller than objects of interest are filtered out. In an embodiment of the invention candidate 3D images having a size smaller than 0.5×0.5 meter and greater than 1.2×1.2 meter are removed.

So for the 80 km speed limit sign example above, the candidate 3D images, of the red boarder and of the white background will pass this size filter. All the other candidate 3D images, such as the black 8, black 0, white patch within the 0 etc., will be too small and will be filtered out. In a final step the two passing candidates will be recognized as lying at the same distance and in the same area of the picture so they will be considered the same sign.

The remaining candidate 3D images are then applied to shape formulas to determine the spatial shape coefficients, e.g. Blair-Bliss & Haralick, which are strongest in detecting road signage. The shape coefficients allow us to filter out objects that do not have a shape corresponding to the shape of objects of interest.

There are many shape coefficients that could be used. They can be divided into two groups:

fast and easy to calculate, more precise to differ objects, but slower

Preferably, two shape coefficients from the second group are determined.

The Blair-Bliss shape coefficient is determined by the following equation:

$$R_B = \frac{S}{\sqrt{2\pi \sum_i r_i^2}}$$

Where:
S—area of the candidate 3D image
$r_i$—i-th pixel distance from shape mass centre
i—shape pixel index.
The Haralick shape coefficient is determined by the following equation:

$$R_H = \sqrt{\frac{(\sum_i d_i)^2}{n \sum_i d_i^2 - 1}}$$

Where:
$d_i$—i-th pixel distance from shape mass centre
n—contour pixels count
i—shape pixel index By means of the shape coefficients, shapes having the form of a circle, triangle and rectangle can be selected efficiently.

It should be noted that selecting segments by it's shape characteristics is a standard prior art action that is done as standard in the field of image processing. Typically, the false positives rate is in range of few percent (1-10%) if this action is performed without further reasoning on only image source data.

However one should also note that attaching depth information to the candidate 3D images enables us to determine the real world size. Checking the real world size is an additional verification step which is not easy to perform if only image source data is taken into account. The additional verification step reduces the number of false positives by a factor of 10, on average.

Action 5. Determine Whether Segment is Occluded in Laser Scanner Data;

This action is performed after action 4 to determine depth consistency of a candidate 3D image. A candidate 3D image could comprise pixels having different depths or does not comprise any depth information. Different depths can be detected by simple well known edge detection filters. By means of said filters the depth consistency is determined. A candidate 3D image can have different depths if for example a tree obstructs partially a road sign in the laser scanned data and not in the source image. As a consequence, some areas of the candidate 3D image could not comprise depth information or could comprise depth information corresponding to objects behind the road sign. It could even happen that a candidate 3D image does not comprise any depth information, which happens when a big tree between the laser scanner and a road sign fully obstructed the laser beam from reaching the road sign.

Action 5a. Calculate Orientation of Occluded Segments from Image Data;

In this step image processing techniques are used to determine the orientation of the candidate 3D images with respect to the orientation or the driving direction of the mobile mapping vehicle. A 6 degree of freedom orientation device is used to measure the orientation and driving direction of the mobile mapping vehicle. The measured orientation and driving direction of the vehicle is used to calculate the orientation and absolute or relative position of the camera when capturing the source image corresponding to the candidate 3D image. The orientation of the object can be obtained by triangulation techniques. If the original source image corresponding to the candidate 3D image is coming from a stereoscopic camera the other image of the stereoscopic pair of images could be used to perform the triangulation and to determine the orientation of the candidate 3D images. In another embodiment the source image preceding the original source image is used to perform the triangulation to calculate distances and to determine the orientation of the object. Every 10 meter distance a source image is captured. Thus, the previous source image is captured 10 meter before the current source image. Consequently the previous source will comprise a representation of the candidate 3D image, however with 10 meter more distance and thus smaller than in the current source image. By means of triangulation the orientation of the object corresponding to the candidate 3D image can be determined.

Action 5b. Calculate Orientation of not Occluded Segments from Laser Data;

This action is performed after action 4 if the depth information of the pixels of the candidate 3D image corresponds to a smooth surface, preferably a planar surface having a predefined depth consistency. This happens when the depth information of the candidate 3D image does not comprise big variations between neighboring pixels by means of the depth information in the orientation of the object with respect to the orientation of the driving direction of the mobile mapping vehicle.

Subsequently, the depth information of the pixels of the candidate is used to determine the orientation of the surface with respect to the driving direction of the mobile mapping vehicle. The determination of the orientation is performed by commonly known algorithms.

The main difference between Action 5a and 5b is that in action 5a only the image source information in combination of the associated position and orientation data and moving direction of the vehicle is used to determine whether the object represented by the candidate 3D image has a predefined orientation with respect to the driving direction, whereas in action 5b only the laser scan data in the form of the depth information is used to determine the orientation of the object.

Furthermore, it should be noted that occlusion appears on about 1 of 100 objects in practice. So the main processing stream will go through action 5b instead of action 5a. Determining the orientation of a candidate 3D image based on depth information in action 5b is more precise and leads to less false positives (a factor of 10) then determining the orientation of each candidate 3D image based on image information in action 5a. Furthermore, action 5b needs less processing power than action 5a.

Action 6. Select, by Means of Filtering, the Perpendicular Segments.

Finally, in action 6, the orientation is used to select which candidate 3D images have to be added to an object database for further processing to obtain more characteristics of the detected object. Examples of further processing are recognition of the type of road sign, for example 80 km speed limit sign, and calculation of the position of the road sign, both being determined for use in a digital map database.

It has been found that when the orientation of the planar surface, that is found within the above mentioned region of interest, is within a range of approximately ±10 degrees of the direction of the moving vehicle, the planar object is most likely a road sign.

The following description will disclose the subsequent actions of the second embodiment of the invention in more detail.

Figures 9A, 9B, 9C:
FIG. 9 illustrates the intermediate results of subsequent processing steps on laser scanner data.

Action 1. Select Regions of Interest of Laser Scanned Points;

Similar to the first embodiment first action 1 is performed to obtain the regions of interest in the laser data. FIG. 9a discloses an example of a 3D representation of all collected laser points in a predefined area with respect to a particular absolute or relative position and FIG. 9b discloses the remaining laser points after performing action 1. It can be seen that all laser points near to the ground are removed from the collected laser points.

7. Extract Perpendicular Surfaces from Regions of Interest;

In this step all the laser points of the regions of interest are used to determine the depth consistency by determining whether neighboring laser points form smooth, planar surfaces. FIG. 9c shows an example of laser points corresponding to detected planar surfaces in the result of FIG. 9b. As road signs have to be detected, the algorithm used looks for surfaces which are almost perpendicular to the direction of movement of the mobile mapping vehicle. The algorithm is performed over the laser scanner points assigned to the region of interest. A Random Sample Consensus (RANSAC) algorithm is used for finding planes. The algorithm selects at random 3 laser points. From those points a plane equation is generated. Subsequently, the algorithm is looking for the laser points that are close to the plane, with a given tolerance and counts the number of close laser points. By repeating the steps, the algorithm is able to find the plane with the highest number of laser points falling within the tolerance. This procedure can be repeated, by removing the laser points corresponding to the plane with the highest number of laser points and to repeat the algorithm with the remaining laser points. In this way all candidate planes in the laser data can be found. The effectiveness of the RANSAC algorithm depends on the ratio of laser points which belong to the plane and the total number of laser points belonging to the region of interest to be analyzed. The relation is given by the following equation:

$$p_{fail} = (1-(p_g)^3)^L$$

where:
$p_{fail}$ is the probability of not finding plane A,
$p_g$ is the probability that random point fits the plane A (ratio of points close to the plane to all points), and
L is the number of loop iterations.

Therefore the best usage of the method is to subdivide the region of interest into sub regions and apply this algorithm on sub regions. In an embodiment of the invention the space of the region of interest is divided in to sub regions having a depth of 1 m in the direction of the moving vehicle.

Figures 9D, 9E, 9F:
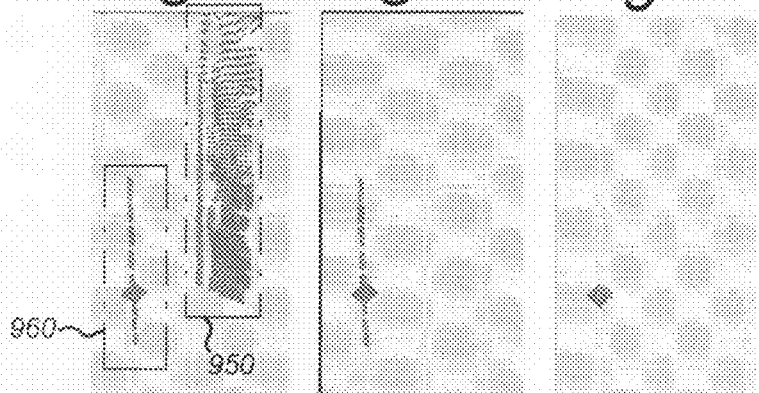
Figure 10:
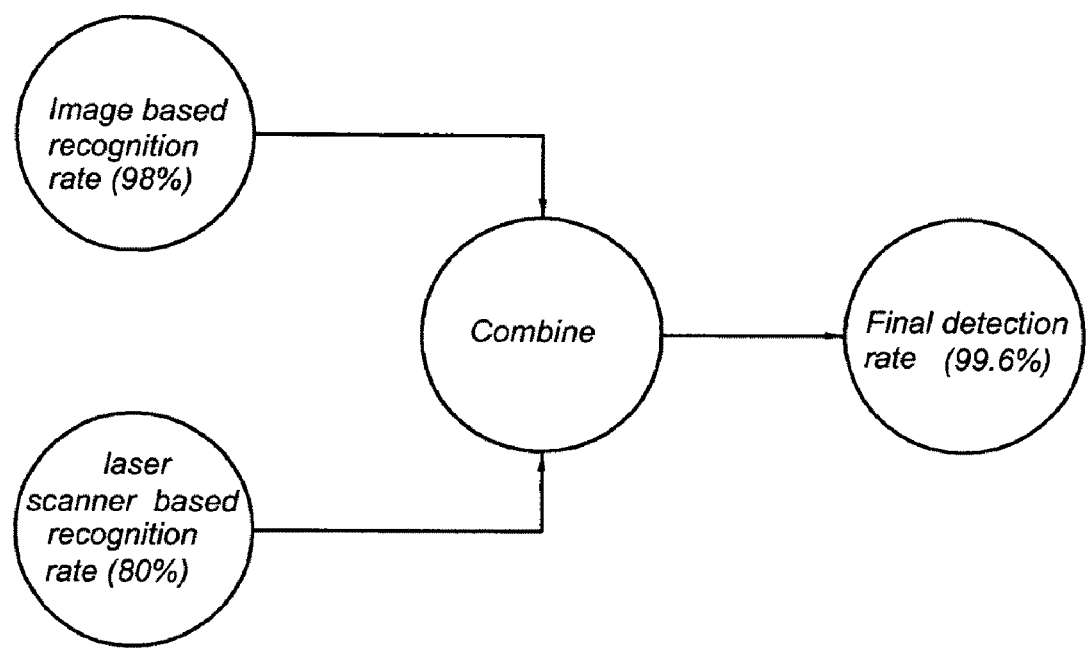
FIG. 10 illustrates advantage of combining two embodiments of the invention.

Subsequently, for each of the candidate planes found by the algorithm, the orientation of the candidate plane with respect to the driving direction of the vehicle is determined. FIG. 9d illustrates two different planes having different orientations. A first plane 950 corresponds to the wall of a building and a second plane 960 corresponds to a road sign with pole. Finally, the laser points corresponding to a planar surface having a predefined orientation are grouped into coherent blocks to reduce further the regions of interest. To detect road signs, it has been found that when the orientation of the planar surface is within a range of approximately ±10 degrees of the direction of the moving vehicle, the planar object is almost always a road sign. FIG. 9e illustrates the result after selecting the object having a predefined orientation. The pole of the sign is also visible in the image as the orientation of the pole could not be determined with respect to the driving direction of the vehicle, whereas the position of the pole is similar to the surface of the properly oriented object. Such a situation will happen with all objects that are attached to surfaces which by means of a surface detection algorithm cannot be judged to be separate surfaces.

The results of this action are candidate planes corresponding to the planes found in the laser scanner data. Each of the candidate planes is separately processed in the further actions to detect objects Action 8. Map Perpendicular Surfaces to Images.

This action is similar to action 2 and is therefore not described in further detail and generates a mask image in dependence of a candidate plane.

Action 9. Perform Color Separation on Image Corresponding to Surfaces.

In this action a mask image generated in action 8 is used to segment the pixels of a source image corresponding to the candidate plane. The segmentation algorithm described in action 3 is used to segment the area corresponding to the mask. As the previous actions already reduced the number of pixels to be analyzed enormously, lower threshold values could be used to obtain the segments. By the actions already performed the chance that a candidate plane is indeed a desired object is increased and therefore the segmentation by color may be performed less accurately. Furthermore, as the number of segments is limited, action 9 not only generates candidate 3D images corresponding to the segments but also candidate 3D images being a combination of one or more segments. As a result of this action, the mask image corresponding to the laser points shown in FIG. 9e will result in the following candidate 3D images: one candidate 3D image for the sign, one for the pole above the sign and one for the pole below the sign, one for the combination of the sign and the pole above the sign, one for the sign and the pole below the sign, etc.

As a consequence, any wrongful color segmentation of the image, which is already assumed to comprise a desired object, is at least partially corrected, by generating candidate 3D images being a combination of segments. In this way a wrongful segmentation of for example the red border of a sign due to shade, is corrected by providing a candidate 3D image being the combination of the segment of the red border in the sun light and the segment of the red border in the shadow. In this way objects are detected which could not be detected in the first embodiment of the invention each segment of the red border will be further processed individually and consequently not detected as road sign due to incorrect size or shape.

Action 10. Select by Means of Filtering by Size and Shape.

In this action the size and shape filter described in action 4 is applied. The size and shape filter will filter out the candidate 3D images regarding the poles. FIG. 9f shows the laser points associated with the selected candidate 3D image. Finally, the candidate 3D images having the desired shape and size are selected and added to an object database for further processing to obtain more characteristics of the detected object.

It should be noted that selecting laser points that build continuous planar surface is a prior art algorithm. After such operation a small amount of erroneous selected laser points are left in selected point clouds, for example the laser points of a pole of a road sign. A further processing action is required to remove those erroneous selected laser points. A typical prior art action that could be used is to analyze the laser data to remove them by means of shape characteristics. However, having in mind the poor vertical & horizontal resolution of the laser data, still even after this analysis, a false positive rate of a few percent is present. By such combination of the laser scanner data and image data processing, an improvement of the false positives rate, of a factor of 100, on average, could be obtained.

It should furthermore be noted that the filter performed to select laser points from the laser scanner data comprises some rules that are taken into account. In an embodiment of action 1, the rules define a road corridor in which the objects to be detected could be present. For example, the road corridor comprises all the laser points which are not further than 10 m to the left and 10 m to the right of the track of the mobile mapping vehicle and the laser points which are above 0.5 m and below 10.0 m of the track of the vehicle along the road surface. The laser points corresponding to the road corridor are stored for further processing. Subsequently, laser points corresponding to the road corridor are split into sub regions of 5 meter along the track of the mobile mapping vehicle. The output of action 1 is then a sequence of sub regions of interest, wherein each sub region of interest has a reference point on the track of the vehicle. Preferably, the reference point is the first position along the track of the vehicle in the corresponding sub region. Then the source images are processed. Before performing the other actions on a source image, the associated position of the source image is used to select the sub region having a reference point that is closest to the associated position of the source image. In this embodiment, only the laser point of a sub region are projected on the image space to obtain a recognition mask. This embodiment enables one to reduce the processing power needed for generating the regions of interest. In action 1, the whole laser scanner data is processed once and a multitude of sets of laser points are generated corresponding to sub regions of interest. Subsequently, for each source image the nearest sub regions of interest of the road corridor in front of the vehicle have to be selected. The number of sub regions to be selected depends on the distance before the vehicle that has to be taken into account. For example, if the distance is 30 m then the first 6 sub regions of 5 m have to be selected.

FIG. 3 shows a flow diagram of an embodiment of the invention. The left path in the flow diagram corresponds to the first embodiment described above and the right path corresponds to the second embodiment of the invention. The result of both embodiments could be grouped together in one database that constitutes a database of objects of interest.

Furthermore, by performing most of the image processing only on segments or candidate 3D images the amount of pixels to be processed is reduced drastically, which results in a speed of detection which is about 5 time faster then full image based processing FIG. 11 illustrates a high level block diagram of a computer system which can be used to implement an object detector performing the method described above.

The computer system of FIG. 9 includes a processor unit 912 and main memory 914. Processor unit 912 may contain a single microprocessor, or may contain a plurality of microprocessors for configuring the computer system as a multi-processor system. Main memory 914 stores, in part, instructions and data for execution by processor unit 912. If the method of the present invention is wholly or partially implemented in software, main memory 914 stores the executable code when in operation. Main memory 914 may include banks of dynamic random access memory (DRAM) as well as high speed cache memory.

The system of FIG. 9 further includes a mass storage device 916, peripheral device(s) 918, input device(s) 920, portable storage medium drive(s) 922, a graphics subsystem 924 and an output display 926. For purposes of simplicity, the components shown in FIG. 9 are depicted as being connected via a single bus 928. However, the components may be connected through one or more data transport means. For example, processor unit 912 and main memory 914 may be connected via a local microprocessor bus, and the mass storage device 916, peripheral device(s) 918, portable storage medium drive(s) 922, and graphics subsystem 924 may be connected via one or more input/output (I/O) buses. Mass storage device 916, which may be implemented with a magnetic disk drive or an optical disk drive, is a non-volatile storage device for storing data, such as the geo-coded image sequences of the respective cameras, calibration information of the cameras, constant and variable position parameters, constant and variable orientation parameters, the candidate 3D images detected object, any of the intermediate results, and instructions for use by processor unit 912. In one embodiment, mass storage device 916 stores the system software or computer program for implementing the present invention for purposes of loading to main memory 914.

Portable storage medium drive 922 operates in conjunction with a portable non-volatile storage medium, such as a floppy disk, micro drive and flash memory, to input and output data and code to and from the computer system of FIG. 9. In one embodiment, the system software for implementing the present invention is stored on a processor readable medium in the form of such a portable medium, and is input to the computer system via the portable storage medium drive 922. Peripheral device(s) 918 may include any type of computer support device, such as an input/output (I/O) interface, to add additional functionality to the computer system. For example, peripheral device(s) 918 may include a network interface card for interfacing computer system to a network, a modem, etc.

Input device(s) 920 provide a portion of a user interface. Input device(s) 920 may include an alpha-numeric keypad for inputting alpha-numeric and other key information, or a pointing device, such as a mouse, a trackball, stylus, or cursor direction keys. In order to display textual and graphical information, the computer system of FIG. 9 includes graphics subsystem 924 and output display 926.

Output display 926 may include a cathode ray tube (CRT) display, liquid crystal display (LCD) or other suitable display device. Graphics subsystem 924 receives textual and graphical information, and processes the information for output to display 926. Output display 926 can be used to report intermediate results of the object detection process and/or display other information that is part of a user interface. The system of FIG. 9 also includes an audio system 928, which includes a microphone. In one embodiment, audio system 928 includes a sound card that receives audio signals from the microphone. Additionally, the system of FIG. 9 includes output devices 932. Examples of suitable output devices include speakers, printers, etc.

The components contained in the computer system of FIG. 9 are those typically found in general purpose computer systems, and are intended to represent a broad category of such computer components that are well known in the art.

Thus, the computer system of FIG. 9 can be a personal computer, workstation, minicomputer, mainframe computer, etc. The computer can also include different bus configurations, networked platforms, multi-processor platforms, etc. Various operating systems can be used including UNIX, Solaris, Linux, Windows, Macintosh OS, and other suitable operating systems.

The method described above could be performed automatically. It might happen that the images are such that image processing tools and object recognition tools need some correction. In that case the method includes some verification and manual adaptation actions to enable the possibility to confirm or adapt intermediate results. These actions could also be suitable for accepting intermediate results or the final result of the detected objects.

The foregoing detailed description of the invention has been presented for purposes of illustration and description. It is not intended to be exhaustive or to limit the invention to the precise form disclosed, and obviously many modifications and variations are possible in light of the above teaching. For example, the invention is also suitable to determine accurately the position of any kind of objects detectable in the source images. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. Method of detecting objects from terrestrial based mobile mapping data, wherein the terrestrial based mobile mapping data has been captured by way of a terrestrial based mobile mapping vehicle driving on a road having a driving direction, the mobile mapping data including laser scanner data, source images obtained by at least one camera and position and orientation data of the terrestrial based mobile mapping vehicle, wherein the laser scanner data includes laser points, each laser point having associated position and orientation data, and each source image comprises associated position and orientation data, the method comprising:
   retrieving a position and orientation of the terrestrial based mobile mapping vehicle;
   filtering the laser scanner data in dependence of the retrieved position and orientation of the terrestrial based mobile mapping vehicle to obtain laser points corresponding to regions of interest;
   retrieving a source image associated with the retrieved position and orientation of the terrestrial based mobile mapping vehicle;
   mapping the obtained laser points corresponding to regions of interest to image coordinates of the retrieved source image to generate a recognition mask;
   combining the generated recognition mask and the retrieved source image to obtain candidate 3D Images representative of possible objects within the regions of interest; and,
   detecting a group of objects from the obtained candidate 3D Images.

2. Method according to claim 1, wherein the combining comprises:
   segmenting the retrieved source image in dependence of the generated recognition mask to obtain intermediate candidate images; and
   adding depth information corresponding to the obtained laser points of regions of interest to corresponding pixels of said intermediate candidate images to obtain the candidate 3D images.

3. Method according to claim 2, wherein the adding depth information comprises:
   using the position and orientation data captured by position and orientation sensors of the terrestrial based mobile mapping vehicle, to accurately transform laser point coordinates into image coordinates of a source image;
   determining depth information for said image coordinates in dependence of the said laser point coordinates and the position and orientation data; and
   adding the depth information to a pixel having said image coordinates.

4. Method according to claim 2, wherein the detecting comprises for each candidate 3D image:
   determining size and shape of candidate 3D image in dependence of said depth information;
   determining, if size and shape are according to defined values, the depth consistency of the candidate 3D image surface in dependence of the depth information;
   determining, if candidate 3D image surface is depth consistent, the orientation of the candidate 3D image to the driving direction in dependence upon the depth information;
   determining, if candidate 3D image surface is not depth consistent, the orientation of the candidate 3D image to the driving direction in dependence of a previous source image; and
   adding candidate 3D image in dependence of the determined orientation to the group of objects.

5. Method according to claim 1, wherein the filtering comprises:
   selecting laser points corresponding to a surface in the regions of interest in dependence of the driving direction and the local depth consistency of the laser scanner data; and, wherein the combining comprises:
      segmenting the source image in dependence of the recognition mask to obtain intermediate candidate images, and
      adding depth information corresponding to the laser points corresponding to the surface to corresponding pixels of said intermediate candidate images to obtain the candidate 3D images.

6. Method according to claim 5, wherein the detecting comprises for each candidate 3D image:
   determining size and shape of the candidate 3D image independence of said depth information; and
   adding candidate 3D image in dependence of size and shape to the group of objects.

7. Method according to claim 4, wherein depth consistency of a surface is a measure of the planarity of the surface.

8. Method of detecting objects from terrestrial based mobile mapping data, wherein the terrestrial based mobile mapping data has been captured by way of a terrestrial based mobile mapping vehicle driving on a road having a driving direction, the mobile mapping data including laser scanner data, source images obtained by at least one camera and position and orientation data of the terrestrial based mobile mapping vehicle, wherein the laser scanner data includes laser points, each laser point having associated position and orientation data, and each source image comprises associated position and orientation data, the method comprising:
   retrieving a position and orientation of the terrestrial based mobile mapping vehicle;
   filtering the laser scanner data in dependence of the position and orientation of the terrestrial based mobile mapping vehicle to obtain laser points corresponding to obtain first regions of interest;
   retrieving a source image associated with the position and orientation of the terrestrial based mobile mapping vehicle;
   mapping the obtained laser points corresponding to the first regions of interest to image coordinates of the retrieved source image to generate a first recognition mask;
   combining the generated first recognition mask and the retrieved source image to obtain first candidate 3D images representative of the first regions of interest;
   detecting a first group of objects in dependence of the driving direction from the obtained first candidate 3D images;

filtering the laser scanner data in dependence of the position and orientation of the terrestrial based mobile mapping vehicle and the local depth consistency of the laser scanner data to obtain laser points corresponding to second regions of interest;

mapping the obtained laser points corresponding to the second regions of interest to image coordinates of the retrieved source image to generate a second recognition mask;

combining the generated second recognition mask and the retrieved source image to obtain second candidate 3D images representative of the second regions of interest;

detecting a second group of objects from the obtained second candidate 3D images; and combining the detected first and second group of objects.

9. Method according to claim 1, wherein the position and orientation data of the vehicle has been determined by a positioning platform.

10. An apparatus for capturing objects for use in a map database, the apparatus comprising:

input device;

a processor readable storage medium; and a processor in communication with said input device and said processor readable storage medium; and an output device to enable the connection with a display unit, said processor readable storage medium storing code to program said processor to perform detection of objects from terrestrial based mobile mapping data, wherein the terrestrial based mobile mapping data has been captured by way of a terrestrial based mobile mapping vehicle driving on a road having a driving direction, the mobile mapping data including laser scanner data, source images obtained by at least one camera and position and orientation data of the terrestrial based mobile mapping vehicle, wherein the laser scanner data includes laser points, each laser point having associated position and orientation data, and each source image includes associated position and orientation data, the processor being useable to:

retrieve a position and orientation of the terrestrial based mobile mapping vehicle;

filter the laser scanner data in dependence of the retrieved position and orientation of the terrestrial based mobile mapping vehicle to obtain laser points corresponding to regions of interest;

retrieve a source image associated with the retrieved position and orientation of the terrestrial based mobile mapping vehicle;

map the obtained laser points corresponding to regions of interest to image coordinates of the source image to generate a recognition mask;

combine the generated recognition mask and the retrieved source image to obtain candidate 3D images representative of possible objects within the regions of interest;

detect a group of objects from the obtained candidate 3D images; and store the detected group of objects on the storage medium for characterizing the object.

11. A non-transitory processor readable medium carrying a computer program, when loaded on a computer arrangement, is arranged to perform the method according to claim 1.

12. Method according to claim 3, wherein the detecting comprises for each candidate 3D image:

determining size and shape of candidate 3D image in dependence of said depth information;

determining, if size and shape are according to defined values, the depth consistency of the candidate 3D image surface in dependence of the depth information;

determining, if candidate 3D image surface is depth consistent, the orientation of the candidate 3D image to the driving direction in dependence upon the depth information;

determining, if candidate 3D image surface is not depth consistent, the orientation of the candidate 3D image to the driving direction in dependence of a previous source image; and adding candidate 3D image in dependence of the determined orientation to the group of objects.

13. Method according to claim 5, wherein depth consistency of a surface is a measure of the planarity of the surface.

14. Method according to claim 6, wherein depth consistency of a surface is a measure of the planarity of the surface.

15. Method according to claim 8, wherein the position and orientation data of the vehicle has been determined by a positioning platform.

16. A non-transitory processor readable medium carrying a computer program, when loaded on a computer arrangement, is arranged to perform the method according to claim 8.

17. A non-transitory computer readable medium including program segments for, when executed on a computer device, causing the computer device to implement the method of claim 1.

18. A non-transitory computer readable medium including program segments for, when executed on a computer device, causing the computer device to implement the method of claim 8.

* * * * *